United States Patent
Singamsetty et al.

(10) Patent No.: US 10,595,362 B2
(45) Date of Patent: Mar. 17, 2020

(54) SYSTEM AND METHOD FOR PERIODIC WIRELESS MESH CREATION (71) Applicant: WiSilica Inc., Laguna Hills, CA (US)

(72) Inventors: Suresh Kumar Singamsetty, Aliso Viejo, CA (US); Dennis Ching Chung Kwan, San Diego, CA (US)

(73) Assignee: WiSilica Inc., Laguna Hills, CA (US)

( * ) Notice: Subject to any disclaimer, the term of this patent is extended or adjusted under 35 U.S.C. 154(b) by 0 days.

(21) Appl. No.: 15/813,126

(22) Filed: Nov. 14, 2017

(65) Prior Publication Data
US 2018/0227982 A1    Aug. 9, 2018

Related U.S. Application Data (60) Provisional application No. 62/421,614, filed on Nov. 14, 2016.

(51) Int. Cl.
H04W 84/18    (2009.01)
H04W 56/00    (2009.01)
H04W 48/16    (2009.01)
H04W 4/38     (2018.01)
H04W 4/02     (2018.01)
H04W 4/80     (2018.01)

(52) U.S. Cl.
CPC .............. H04W 84/18 (2013.01); H04W 4/02 (2013.01); H04W 4/38 (2018.02); H04W 48/16 (2013.01); H04W 56/001 (2013.01); H04W 4/80 (2018.02); Y02D 70/00 (2018.01); Y02D 70/10 (2018.01); Y02D 70/1224 (2018.01); Y02D 70/1242 (2018.01); Y02D 70/1262 (2018.01); Y02D 70/14 (2018.01); Y02D 70/142 (2018.01); Y02D 70/144 (2018.01); Y02D 70/162 (2018.01); Y02D 70/166 (2018.01); Y02D 70/20 (2018.01); Y02D 70/22 (2018.01)

(58) Field of Classification Search
CPC ......... H04W 48/16; H04W 4/02; H04W 4/38; H04W 4/80; H04W 56/001; H04W 84/18
See application file for complete search history.

(56) References Cited

U.S. PATENT DOCUMENTS

| 2014/0006161 | A1* | 1/2014 | Jabara ................ G06Q 30/0267 705/14.57 |
| 2015/0341874 | A1* | 11/2015 | Nguyen-Dang ........................... H04W 52/0209 370/350 |
| 2016/0021511 | A1* | 1/2016 | Jin .......................... H04W 4/04 455/457 |
| 2016/0157050 | A1* | 6/2016 | He ........................ H04W 8/005 455/41.2 |

* cited by examiner

Primary Examiner — Kevin C. Harper
Assistant Examiner — Derrick V Rose
(74) Attorney, Agent, or Firm — Rowan TELS LLC (57) ABSTRACT Systems and methods for the periodic creation of wireless mesh networks are disclosed. In order to save power the nodes in the mesh network may periodically switch from being in a broadcast mode and a skip cycle. When in the broadcast mode the node may cycle broadcasting new IDs in order to prevent spoofing.

18 Claims, 10 Drawing Sheets (PRIOR ART)

SYSTEM AND METHOD FOR PERIODIC WIRELESS MESH CREATION

CROSS-REFERENCE TO RELATED APPLICATIONS

This present disclosure claims the benefit of U.S. Provisional Application Ser. No. 62/421,614, filed on Nov. 14, 2016.

BACKGROUND

In some conventional mesh networks, control and management is implemented utilizing remote transmitters (e.g., beacons) that emit an identifier to compatible receiving devices (mesh nodes), triggering delivery of a targeted push notification. These transmitters operate as part of a targeted notification system that includes a database of identifiers for each transmitter and targeted notifications. The emitted identifiers are unique to each transmitter, allowing the notification system to determine the location of the receiving device based on the location of the transmitter.

Conventional transmitters do not communicate with an administrator to minimize power consumption. As a result, the transmitters do not provide status information or alert administrators when mesh node battery levels are low. Further, conventional transmitters emit static identifiers. These identifiers are susceptible to spoofing.

A solution is needed to minimize power consumption on battery powered mesh node devices and reduce susceptibility to spoofing of transmitters while permitting communication between the transmitters and an administrator.

BRIEF SUMMARY OF THE INVENTION

The present invention solves the aforementioned problems by implementing systems and methods for the periodic creation of wireless mesh networks are disclosed. In order to save power the nodes in the mesh network may periodically switch from being in a broadcast mode and a skip cycle. When in the broadcast mode the node may cycle broadcasting new IDs in order to prevent spoofing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Overview

Herein various embodiments of systems and methods for the periodic creation of wireless mesh networks are disclosed. These embodiments may be operated within a mesh network environment using various wireless protocols and technologies, including those defined below.

Mesh Network

A mesh network is a type of machine communication system in which each client node (sender and receiver of data messages) of the network also relays data for the network. All client nodes cooperate in the distribution of data in the network. Mesh networks may in some cases also include designated router and gateway nodes (e.g., nodes that connect to an external network such as the Internet) that are or are not also client nodes. The nodes are often laptops, cell phones, or other wireless devices. The coverage area of the nodes working together as a mesh network is sometimes called a mesh cloud.

Mesh networks can relay messages using either a flooding technique or a routing technique. Flooding is a routing algorithm in which every incoming packet, unless addressed to the receiving node itself, is forwarded through every outgoing link of the receiving node, except the one it arrived on. With routing, the message is propagated through the network by hopping from node to node until it reaches its destination. To ensure that all its paths remain available, a mesh network may allow for continuous connections and may reconfigure itself around broken paths. In mesh networks there is often more than one path between a source and a destination node in the network. A mobile ad hoc network (MANET) is usually a type of mesh network. MANETs also allow the client nodes to be mobile.

A wireless mesh network (WMN) is a mesh network of radio nodes. Wireless mesh networks can self-form and self-heal and can be implemented with various wireless technologies and need not be restricted to any one technology or protocol. Each device in a mobile wireless mesh network is free to move, and will therefore change its routing links among the mesh nodes accordingly.

Mesh networks may be decentralized (with no central server) or centrally managed (with a central server). Both types may be reliable and resilient, as each node needs only transmit as far as the next node. Nodes act as routers to transmit data from nearby nodes to peers that are too far away to reach in a single hop, resulting in a network that can span larger distances. The topology of a mesh network is also reliable, as each node is connected to several other nodes. If one node drops out of the network, due to hardware failure or moving out of wireless range, its neighbors can quickly identify alternate routes using a routing protocol.

Figure 1:
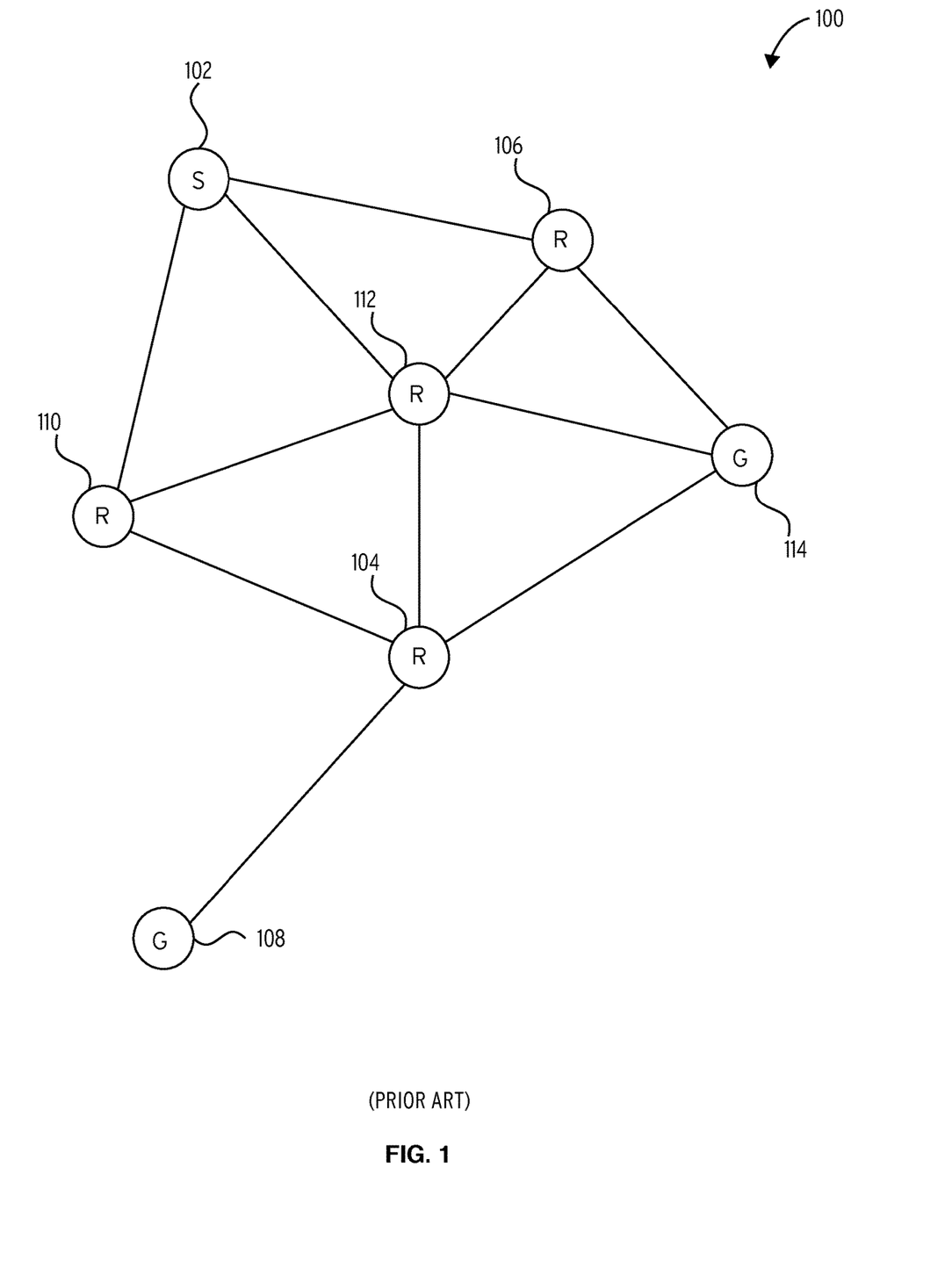
FIG. 1 illustrates a wireless mobile mesh network 100 in accordance with one embodiment.

Referring to FIG. 1, an exemplary wireless mobile mesh network 100 includes a server node 102, a router node 110, a router node 112, a router node 106, a router node 104, a gateway node 114, and a gateway node 108. The server node 102, the gateway node 114, and the gateway node 108 also operate as router nodes. Every node in the network participates in the routing of communications in the wireless mobile mesh network 100. The gateway node 114 and gateway node 108 provide an interface between the wireless mobile mesh network 100 and an external network, such as the Internet or a local area network. The server node 102 provides some level of centralized management for the wireless mobile mesh network 100, and may be optional if each node acts autonomously to self-manage. One or more of the nodes may be fixed in location, some of the nodes may be mobile, or all of the nodes may be mobile.

Beacon

Figure 2:
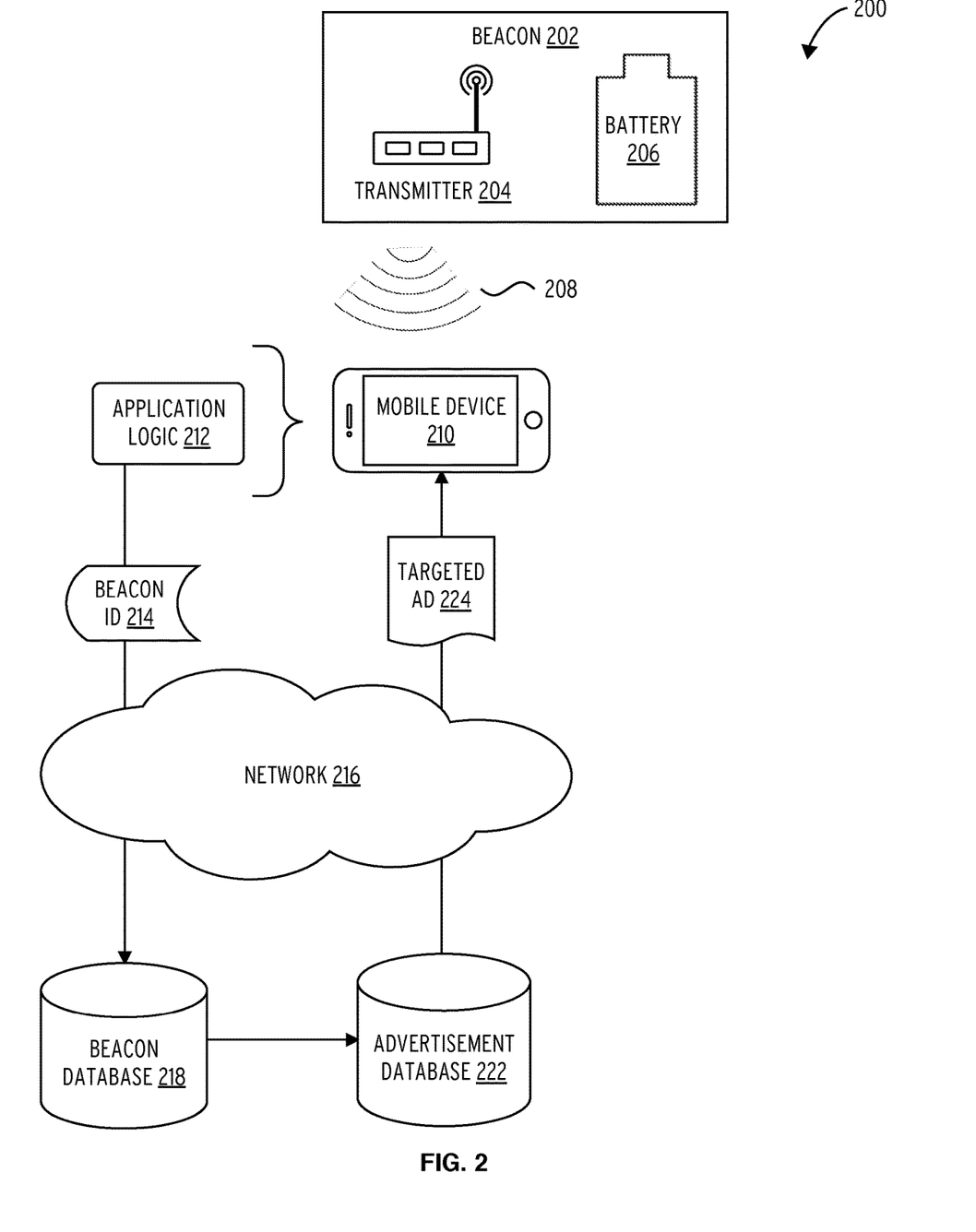
FIG. 2 illustrates a mesh network system environment 200.

Referencing FIG. 2, a mesh network system environment 200 includes a beacon 202, a network 216, a mobile device 210, a beacon database 218, and an advertisement database 222. The beacon 202 includes a transmitter 204 and a battery 206. The beacon 202 transmits a beacon identifier 208 to the mobile device 210. The mobile device 210 includes application logic 212. The application logic 212 communicates with the beacon database 218 to perform a lookup of the beacon ID 214. The beacon database 218 communicates details of the lookup with the advertisement database 222 to select a targeted ad 224 to deliver to the mobile device 210.

The mobile device 210 detects the beacon ID 214 and performs a lookup of the beacon 202 in the beacon database 218. The beacon 202 may operate on a limited power supply. The beacon 202 may communicate with the mobile device 210 yet be out of range for communicating with an administrative device or management node. The beacon ID 214 may be utilized to identify the location of the mobile device 210 based on the location of the beacon 202.

Periodic Mesh System

Figure 3:
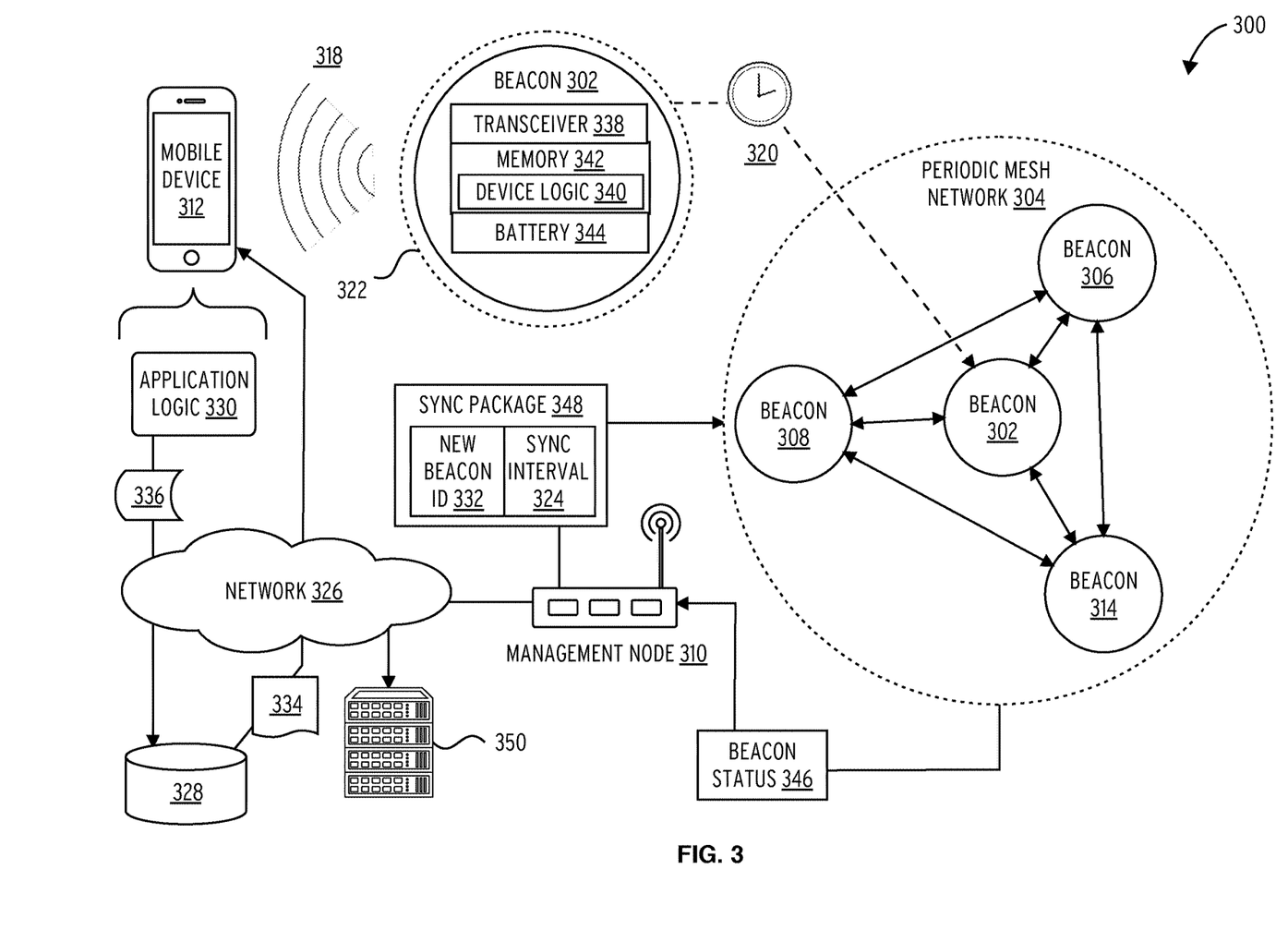
FIG. 3 illustrates an embodiment of a system for periodic wireless mesh creation 300.

Referencing FIG. 3, a system for periodic wireless mesh creation 300 comprises beacon 302, beacon 306, beacon 308, beacon 314, a mobile device 312, a network 326, a beacon/advertisement database 328, a beacon management system 350, and a management node 310.

The beacon 302 comprises a transceiver 338, a battery 344, and memory 342 comprising device logic 340. The beacon 302 operates in a broadcast mode 322 during which the beacon 302 emits a beacon ID 318 to a mobile device 312. The beacon 302 operates in the broadcast mode 322 until a synchronization time 320 triggers the beacon 302 to form a periodic mesh network 304 with beacon 306, beacon 308, and beacon 314 to communicate with the management node 310.

The management node 310 communicates a synchronization package 348 comprising a new beacon ID 332 and a synchronization interval 324 to the periodic mesh network 304. The management node 310 communicates the beacon status 346 to the beacon management system 350 by way of the network 326, which may also be referred to as a static network.

The mobile device 312 comprises application logic 330. The application logic 330 performs a lookup of beacon ID 336 through the beacon/advertisement database 328 by way of the network 326. The beacon/advertisement database 328 identifies a selected ad 334 from the beacon ID 336 and communicates the selected ad 334 to the mobile device 312 by way of the network 326.

Figure 8:
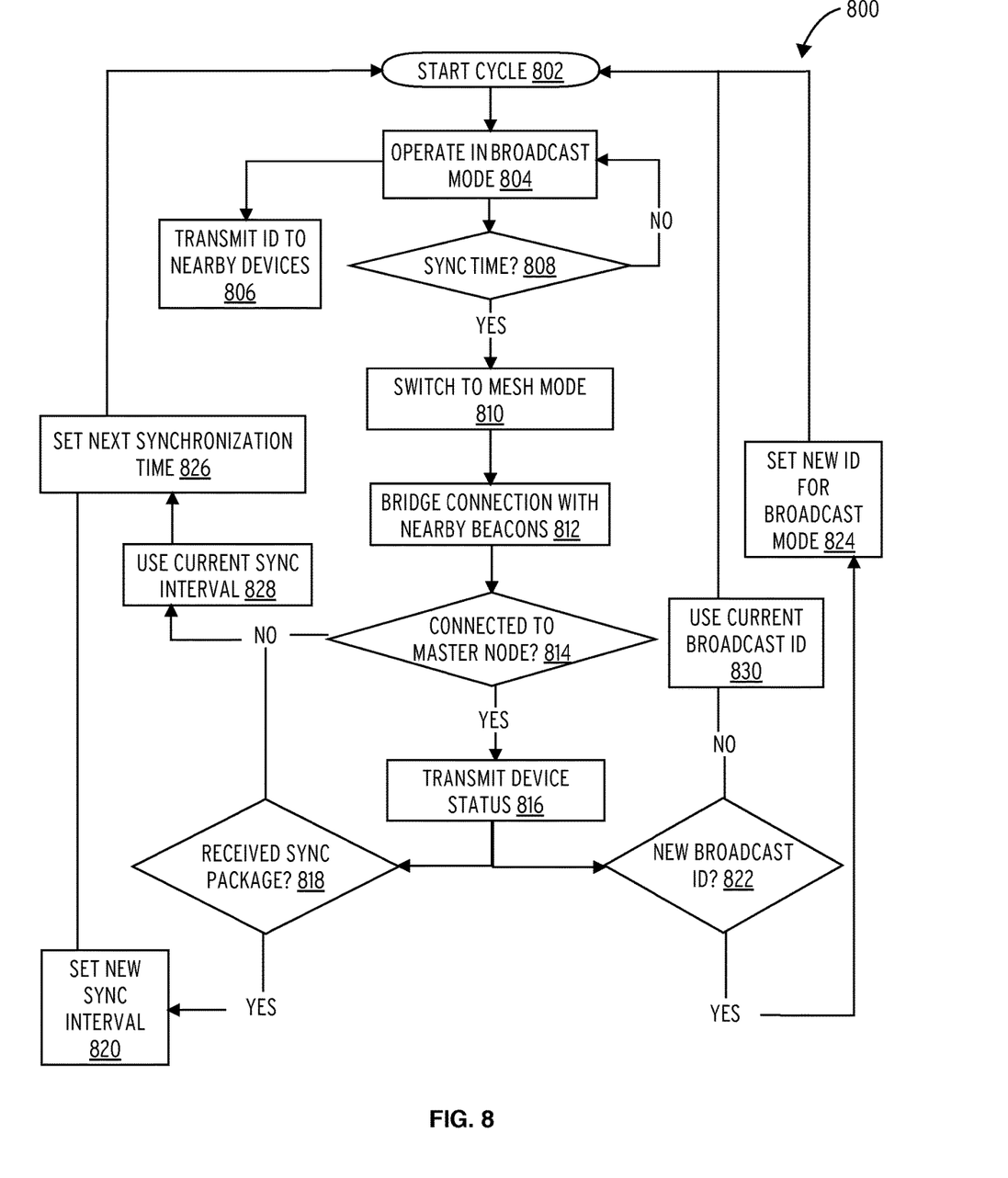
FIG. 8 illustrates an embodiment of a process for periodic wireless mesh creation 800.

The system for periodic wireless mesh creation 300 may be operated in accordance with the process described in FIG. 8.

The beacons of the system for periodic wireless mesh creation 300 may operate as nodes in a system for integrating building automation with location awareness utilizing wireless mesh technology illustrated in FIG. 4, FIG. 5, FIG. 6, and FIG. 7.

Location Awareness

Figure 4:
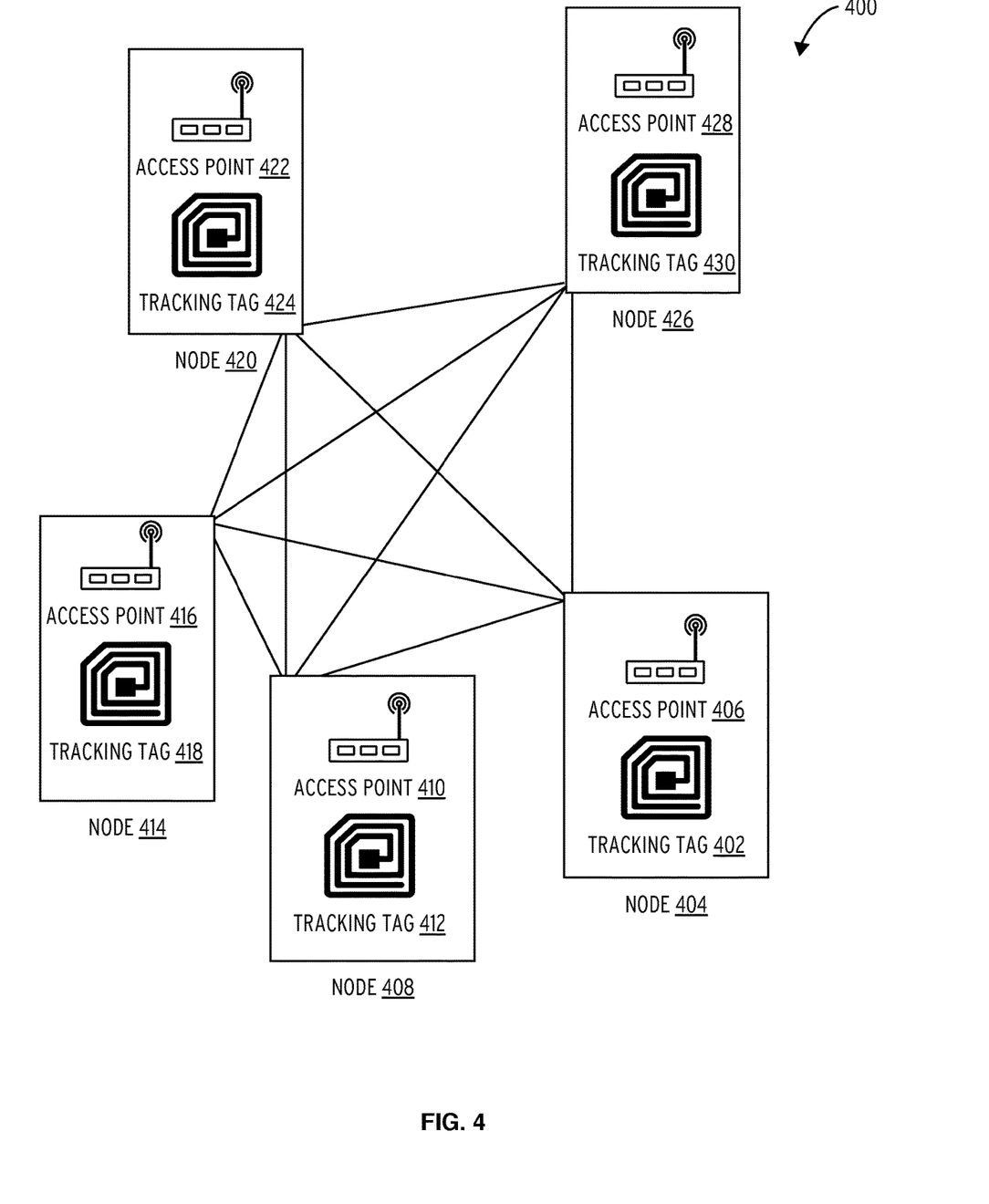
FIG. 4 illustrates an embodiment of a system for integrating building automation with location awareness utilizing wireless mesh technology 400.

FIG. 4 illustrates an embodiment of a system for integrating building automation with location awareness utilizing wireless mesh technology 400, comprising node 420, node 426, node 404, node 414, and node 408.

The node 420 comprises the tracking tag 424, and the access point 422. The node 426 comprises the access point 428 and the tracking tag 430. The node 404 comprises the tracking tag 402 and the access point 406. The node 408 comprises the access point 410 and the tracking tag 412. The node 414 comprises the access point 416 and the tracking tag 418. Each node is enabled to communicate via its respective access point and thus may be part of a mesh network that is reliable and resilient, as each node needs only transmit as far as the next node.

The technology 400 may be established on an existing automation network, with each node within the network having an access point and a tracking tag. The high density of access points for assets allows tracking of nodes and tags to be more accurate.

Figure 5:
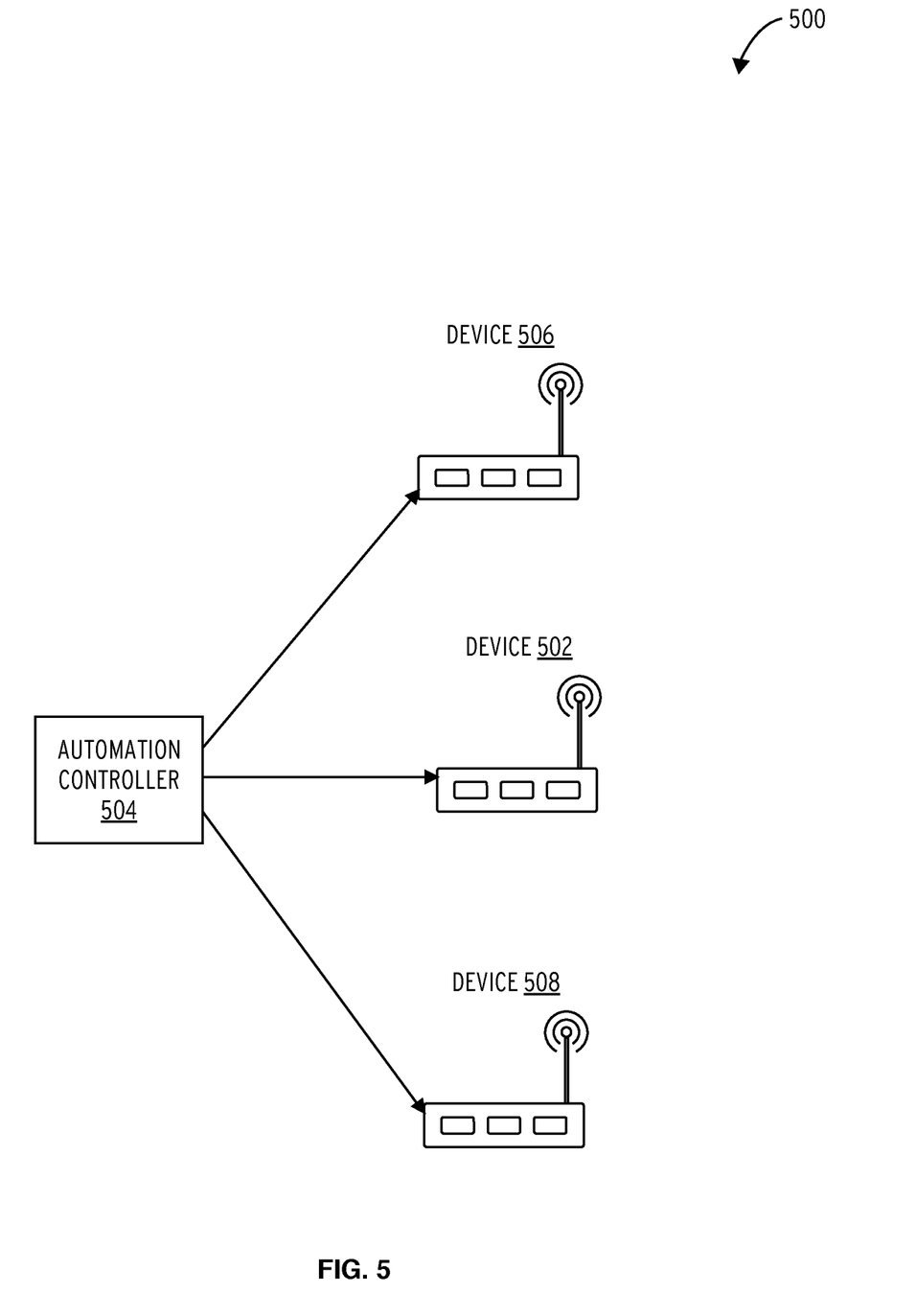
FIG. 5 illustrates an embodiment of a system 500 for integrating building automation with location awareness utilizing wireless mesh technology.

Referring to FIG. 5, a building automation and location awareness environment 500 comprises an automation controller 504 and building automation devices 502, 506, and 508. The automation controller 504 may be a combination of hardware and software that serves as a central manager of a building automation system. The automation controller 504 may be configured to control appliances (e.g. robots), control an indoor environment (e.g. lighting, heating, etc.), and track assets, among other tasks, within a building. The automation controller 504 may be hosted on a server and may be located on premises or off site. Further, the automation controller 504 may be networked with building automation devices 502, 506, 508 each of which may provide an access point for a mesh network. The building automation devices 502, 506, 508 may have a fixed location (e.g. a wall mounted wireless router) or may be mobile (e.g. a mobile phone or tablet).

Figure 6:
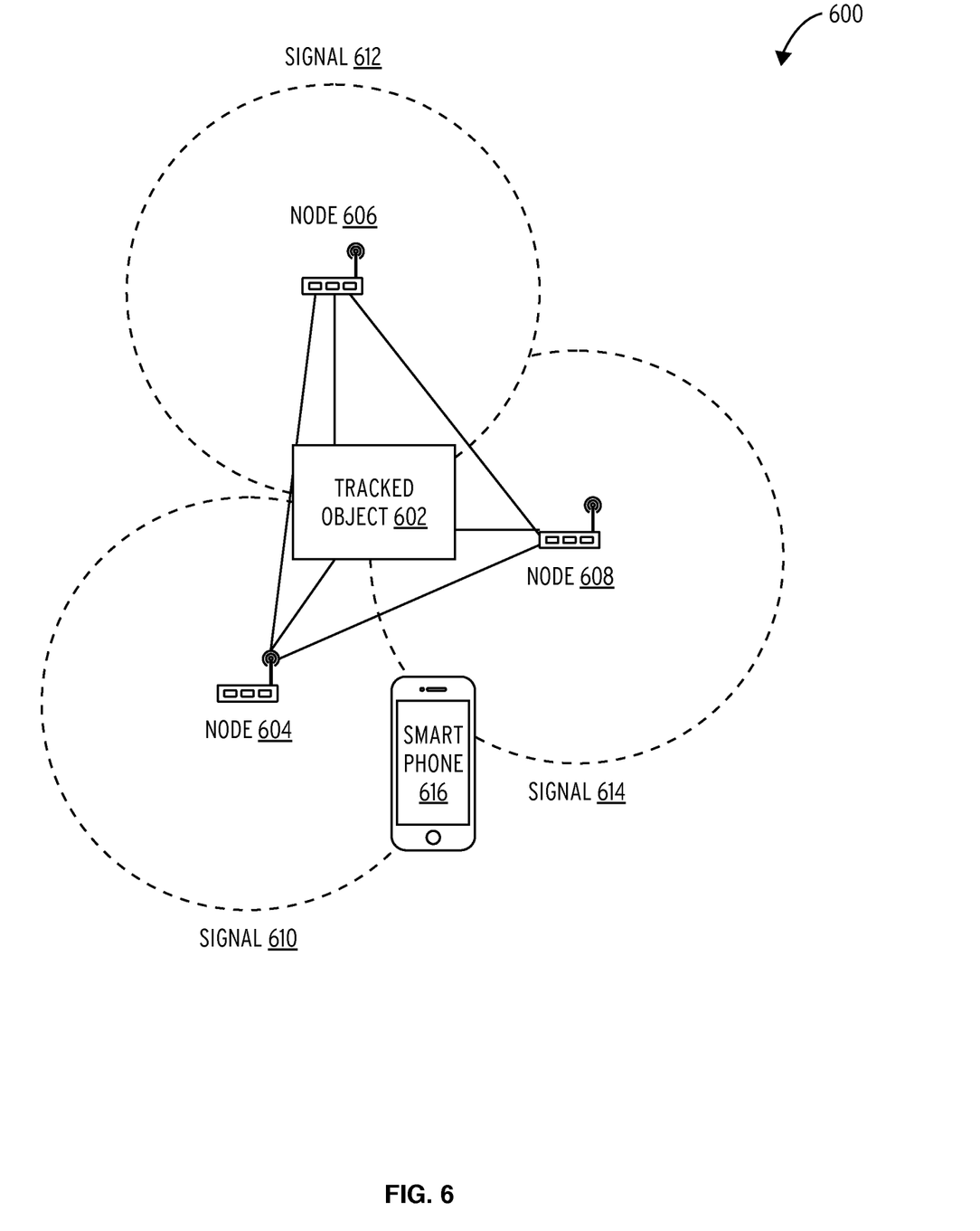
FIG. 6 illustrates an aspect of a system for integrating building automation with location awareness utilizing wireless mesh technology 600

FIG. 6 illustrates an embodiment of a system 600 for integrating building automation with location awareness utilizing wireless mesh technology. The system 600 comprises a tracked object 602, a node 604, a node 606, a node 608, a signal 610, a signal 612, a signal 614, and a smart phone 616.

Nodes listen to signals from other nodes and tags on the mesh network and relay that information to the gateway. The gateway may locate itself utilizing signal strength and signal angle of arrival (directional antenna) from the nodes and tags on the mesh network.

The node 606, node 608 or node 604 may be designated as "anchor nodes" may be to help efficiently determine location and identification of other tracked objects relative to themselves.

Figure 7:
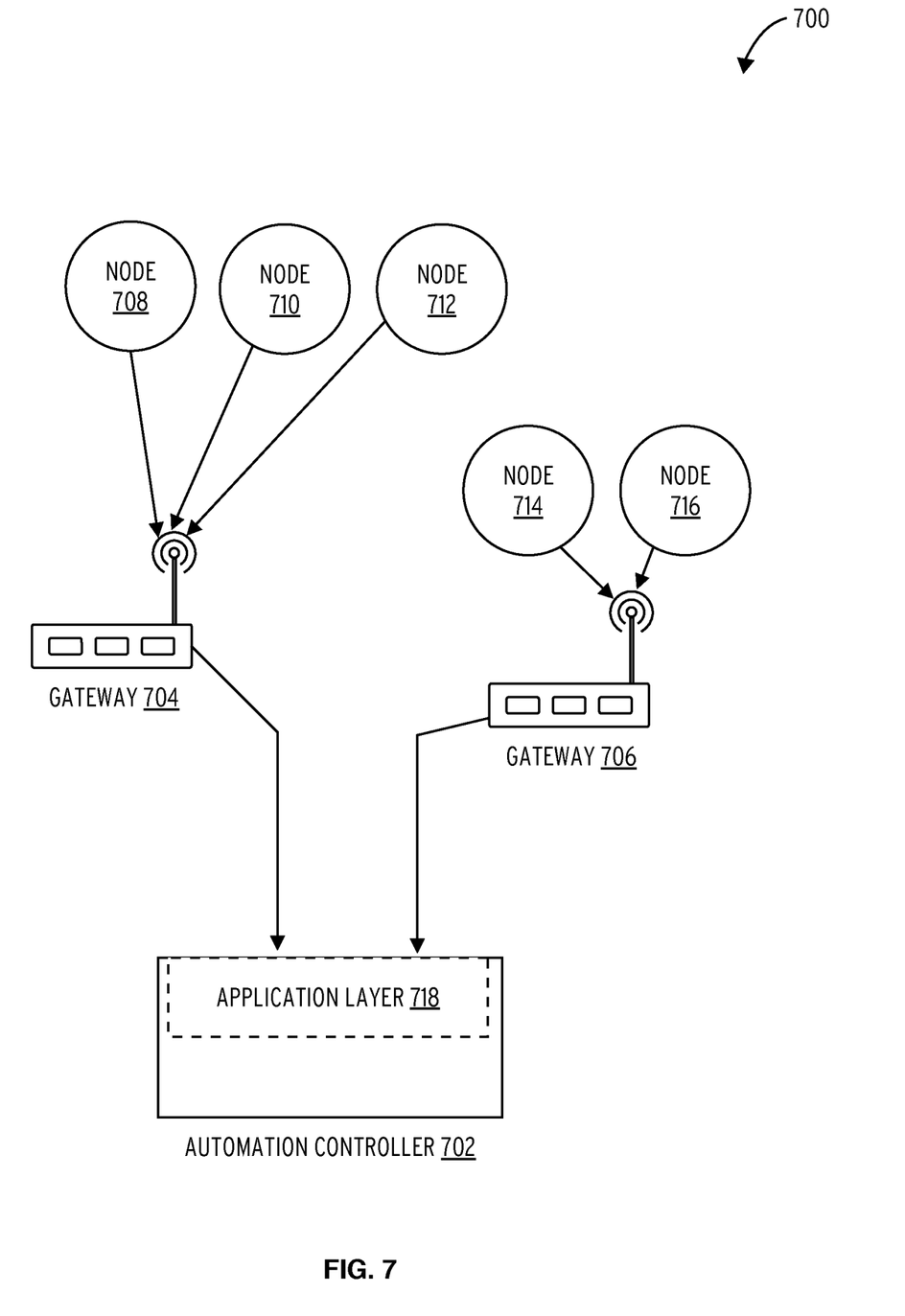
FIG. 7 illustrates an embodiment of a system for integrating building automation with location awareness utilizing wireless mesh technology 700.

FIG. 7 illustrates an embodiment of a system for integrating building automation with location awareness utilizing wireless mesh technology 700, including a node 708, node 710, node 712, node 714, node 716, a gateway 704, a gateway 706, and application layer 718 and an automation controller 702.

Due to their proximity, node 712, node 710, and node 708 may be grouped together to form a mesh network that can communicate with the gateway 704. Similarly node 714 and the node 716 may form a mesh network and communicate with gateway 706. Gateway 706 and the gateway 704 pick up and aggregate data from their respective nodes and may determine relative location and respective signal strength. Utilizing such tiered aggregation allows for learning at the cloud level (e.g. in the application layer).

Periodic Mesh Process

Referencing FIG. 8, a process for periodic wireless mesh creation 800 begins a cycle of operating a beacon in broadcast mode before switching to a wireless mesh mode to create a periodic wireless mesh network. (start block 802). In block 804, the process for periodic wireless mesh creation 800 begins operating the beacon in broadcast mode. The beacon identifies a nearby compatible device and transmits beacon ID to the nearby device (block 806). In decision block 808, the process for periodic wireless mesh creation 800 checks if it is the synchronization time.

If the process for periodic wireless mesh creation 800 determines that it is not the synchronization time, the beacon continues to operate in broadcast mode (block 804). Otherwise, the process for periodic wireless mesh creation 800 determines it is the synchronization time and the beacon switches to the wireless mesh mode (block 810). During wireless mesh mode the beacon bridges connections with nearby beacons to form a wireless mesh (block 812).

In decision block 814, the process for periodic wireless mesh creation 800 determines whether the beacon is connected to a master node. If the process for periodic wireless mesh creation 800 determines that the beacon is not connected to a master node, the process for periodic wireless mesh creation 800 uses the current synchronization interval (block 828) to set the next synchronization time (block 826) and waits for the cycle to start (start block 802). Otherwise, if the process for periodic wireless mesh creation 800 determines the beacon is connected to a master node, the beacon transmits device status information to the master node (block 816).

In decision block 818, the process for periodic wireless mesh creation 800 determines if the beacon has received a synchronization package from the master node. If the process for periodic wireless mesh creation 800 determines that beacon has not received a synchronization package from the master node, the process for periodic wireless mesh creation 800 uses the current synchronization interval (block 828) to set the next synchronization time (block 826) and waits for the cycle to start (start block 802). Otherwise, if the process for periodic wireless mesh creation 800 determines the beacon has received a synchronization package from the master node, the process for periodic wireless mesh creation 800 sets a new synchronization interval for the beacon (block 820) and sets the next synchronization time using the new interval (block 826) and waits for the cycle to start (start block 802).

In decision block 822, the process for periodic wireless mesh creation 800 determines whether the beacon has received instructions to broadcast a new beacon ID during broadcast mode. If the process for periodic wireless mesh creation 800, determines that the beacon has not instructions to broadcast a new beacon ID, the process for periodic wireless mesh creation 800 continues using the current beacon ID during the broadcast mode (block 830) and waits for the cycle to start (start block 802). Otherwise, if the process for periodic wireless mesh creation 800 determines the beacon has received instructions to broadcast a new beacon ID, the process for periodic wireless mesh creation 800 sets the new beacon ID for using during the broadcast mode (block 824), and waits for the cycle to start (start block 802).

Hardware

Figure 9:
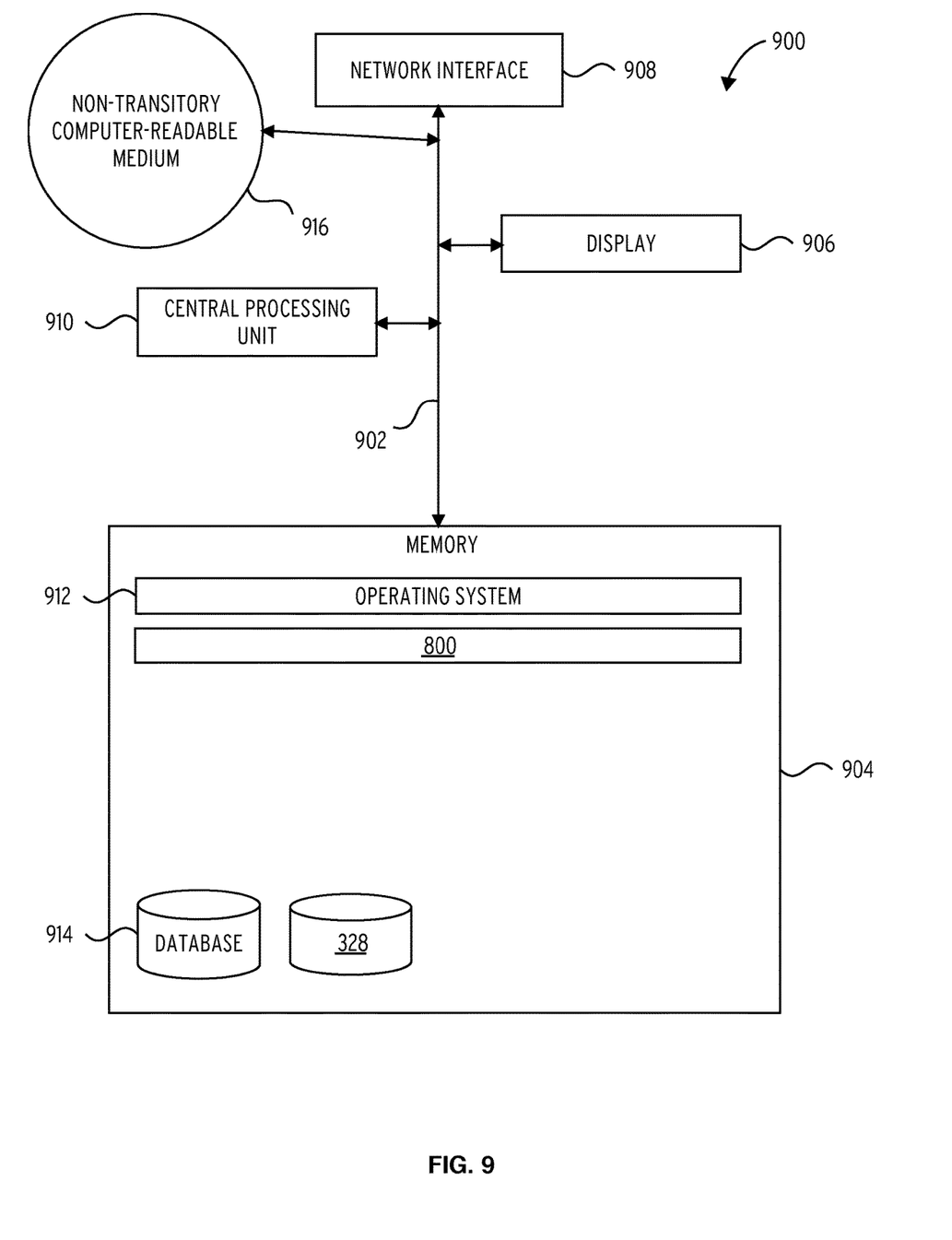
FIG. 9 illustrates a system 900 in accordance with one embodiment.

FIG. 9 illustrates several components of an exemplary system 900 in accordance with one embodiment. In various embodiments, system 900 may include a desktop PC, server, workstation, mobile phone, laptop, tablet, set-top box, appliance, or other computing device that is capable of performing operations such as those described herein. In some embodiments, system 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 900 may comprise one or more physical and/or logical devices that collectively provide the functionalities described herein. In some embodiments, system 900 may comprise one or more replicated and/or distributed physical or logical devices.

In some embodiments, system 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 900 includes a bus 902 interconnecting several components including a network interface 908, a display 906, a central processing unit 910, and a memory 904.

Memory 904 generally comprises a random access memory ("RAM") and permanent non-transitory mass storage device, such as a hard disk drive or solid-state drive. Memory 904 stores an operating system 912 and a process for periodic wireless mesh creation 800.

These and other software components may be loaded into memory 904 of system 900 using a drive mechanism (not shown) associated with a non-transitory computer-readable medium 916, such as a floppy disc, tape, DVD/CD-ROM drive, memory card, or the like.

Memory 904 also includes database 914 and a beacon/advertisement database 328. In some embodiments, system 900 may communicate with database 914 and the beacon/advertisement database 328 via network interface 908, a storage area network ("SAN"), a high-speed serial bus, and/or via the other suitable communication technology.

In some embodiments, database 914 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 10:
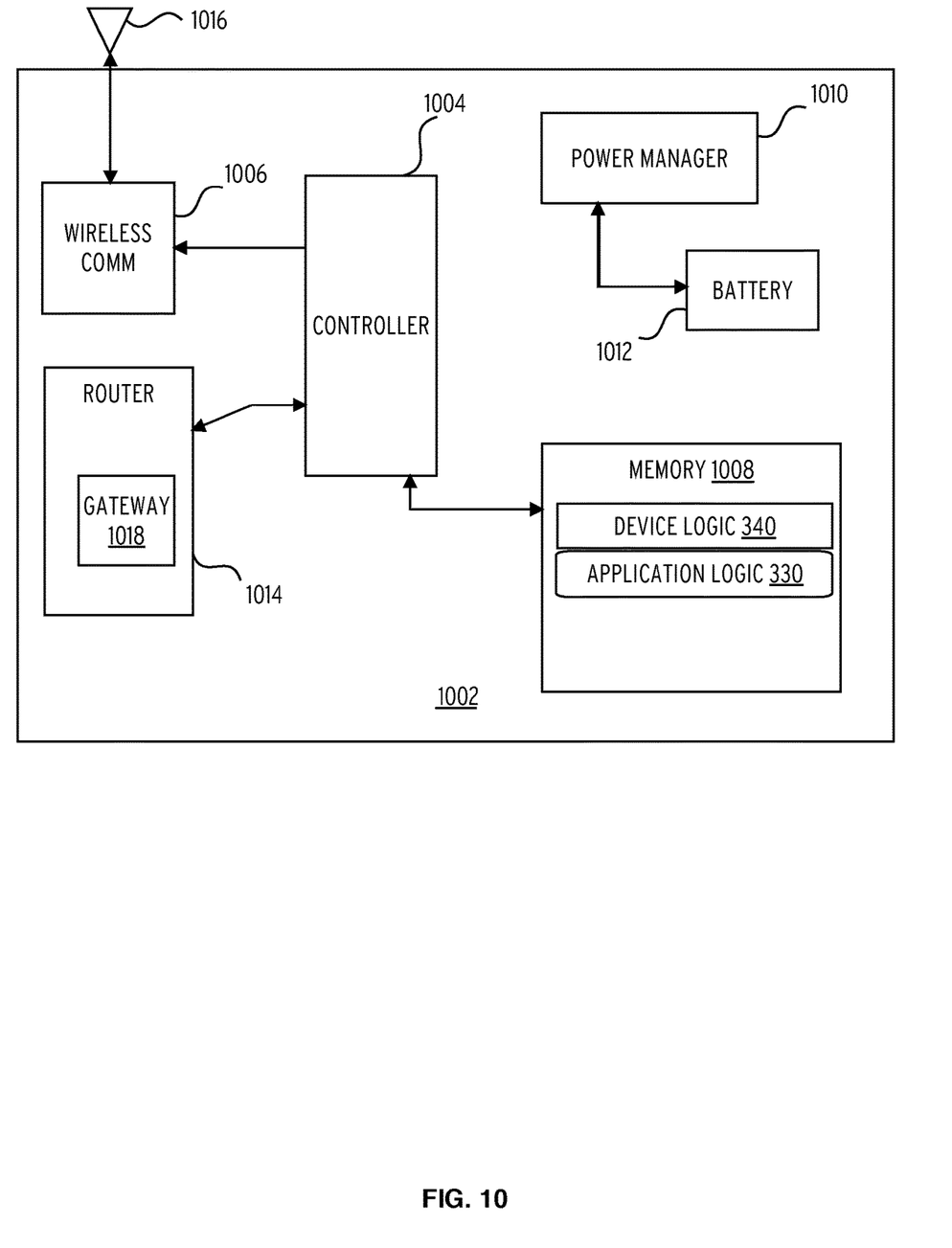
FIG. 10 illustrates an embodiment of a mobile wireless node 1002.

Referring to FIG. 10, a mobile wireless node 1002 includes an antenna 1016, a signal processing and system control 1004, a wireless communication 1006, a memory 1008, a power manager 1010, a battery 1012, a router 1014, a mobile wireless node 1002, and a gateway 1018.

The signal processing and system control 1004 controls and coordinates the operation of other components as well as providing signal processing for the mobile wireless node 1002. For example the signal processing and system control 1004 may extract baseband signals from radio frequency signals received from the wireless communication 1006 logic, and process baseband signals up to radio frequency signals for communications transmitted to the wireless communication 1006 logic. The signal processing and system control 1004 may comprise a central processing unit, digital signal processor, one or more controllers, or combinations of these components.

The wireless communication 1006 includes memory 1008 which may be utilized by the signal processing and system control 1004 to read and write instructions (commands) and data (operands for the instructions). The memory 1008 may include device logic 340 and application logic 330.

The router 1014 performs communication routing to and from other nodes of a mesh network (e.g., wireless mobile mesh network 100) in which the mobile wireless node 1002 is utilized. The router 1014 may optionally also implement a network gateway 1018.

The components of the mobile wireless node 1002 may operate on power received from a battery 1012. The battery 1012 capability and energy supply may be managed by a power manager 1010.

The mobile wireless node 1002 may transmit wireless signals of various types and range (e.g., cellular, WiFi, BlueTooth, and near field communication i.e. NFC). The mobile wireless node 1002 may also receive these types of wireless signals. Wireless signals are transmitted and received using wireless communication 1006 logic coupled to one or more antenna 1016. Other forms of electromagnetic radiation may be used to interact with proximate devices, such as infrared (not illustrated).

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Definitions

Various terminology is utilized herein, and should be assigned its conventional meaning in the relevant arts unless expressly defined herein.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Wireless Protocols

Wireless mesh nodes that may utilize the disclosed embodiments may implement various wireless protocols, including but not limited to:

"6LowPAN": an acronym of IPv6 (Internet Protocol Version 6) over Low power Wireless Personal Area Networks. It is a wireless standard for low-power radio communication applications that need wireless internet connectivity at lower data rates for devices with limited form factor. 6LoWPAN utilizes the RFC6282 standard for header compression and fragmentation. This protocol is used over a variety of networking media including Bluetooth Smart (2.4 GHz) or ZigBee or low-power RF (sub-1 GHz) and as such, the data rates and range may differ based on what networking media is used.

"Bluetooth Low-Energy (BLE)—or Bluetooth Smart": a wireless personal area network technology aimed at reduced power consumption and cost while maintaining a similar communication range as traditional Bluetooth. Like traditional Bluetooth, the frequency utilized is 2.4 GHz (ISM-Industrial, Scientific and Medical), the maximum range is generally 50-150 m with data rates up to 1 Mbps.

"Cellular": a communication network where the last link is wireless. The network is distributed over land areas called cells and utilizes one of the following standards GSM/GPRS/EDGE (2G), UMTS/HSPA (3G), LTE (4G). Frequencies are generally one of 900/1800/1900/2100 MHz. Ranges are 35 km max for GSM; 200 km max for HSPA and typical data download rates are: 35-170 kps (GPRS), 120-384 kbps (EDGE), 384 Kbps-2 Mbps (UMTS), 600 kbps-10 Mbps (HSPA), 3-10 Mbps (LTE).

"LoRaWAN": Low Power Wide Area Network, a media access control (MAC) protocol for wide area networks for low-cost, low-power, mobile, and secure bi-directional communication for large networks of up to millions of devices. LoRaWAN is employed on various frequencies, with a range of approximately 2-5 km (urban environment) to 15 km (suburban environment) and data rates of 0.3-50 kbps.

"NFC": "Near Field Communication" and is a subset of RFID (Radio Frequency Identifier) technology. NFC is standardized in ECMA-340 and ISO/IEC 18092. It employs electromagnetic induction between two loop antennae when NFC devices are within range (10 cm). NFC utilizes the frequency of 13.56 MHz (ISM). Data rates range from 106 to 424 kbit/s.

"SigFox": a cellular-style system that enables remote devices to connect using ultra-narrow band (UNB) technology and binary phase-shift keying (BPSK) to encode data. Utilizes the 900 MHz frequency and has a range of 30-50 km in rural environments and 3-10 km in urban environments with data rates from 10-1000 bps.

"Thread": a wireless mesh network standard that utilizes IEEE802.15.4 for the MAC (Media Access Control) and Physical layers, IETF IPv6 and 6LoWPAN (IVP6). Thread operates at 250 kbps in the 2.4 GHz band. The IEEE 802.15.4-2006 version of the specification is used for the Thread stack.

"Weightless": an open machine to machine protocol which spans the physical and mac layers. Operating frequency: 200 MHz to 1 GHz (900 MHz (ISM) 470-790 MHz (White Space)) Fractional bandwidth of spectrum band: <8% (for continuous tuning). Range up to 10 km and data Rates which range from a few bps up to 100 kbps "WiFi": a wireless network standard based on 802.11 family which consists of a series of half-duplex over-the-air modulation techniques that use the same basic protocol. Frequencies utilized include 2.4 GHz and 5 GHz bands with a range of approximately 50 m. Data rate of 600 Mbps maximum, but 150-200 Mbps is more typical, depending on channel frequency used and number of antennas (latest 802.11-ac standard should offer 500 Mbps to 1 Gbps).

"Z-Wave": a wireless standard for reliable, low-latency transmission of small data packets. The Z-Wave utilizes the Z-Wave Alliance ZAD12837/ITU-T G.9959 standards and operated over the 900 MHz frequency in the US (Part 15 unlicensed ISM) and is modulated by Manchester channel encoding. Z-Wave has a range of 30 m and data rates up to 100 kbit/s.

"ZigBee": a wireless networking standard for low power, low data rate, and lost cost applications. The Zigbee protocol builds upon the Institute of Electrical and Electronics Engineers (IEEE) 802.15.4 standard which defines a short range, low power, low data rate wireless interface for small devices that have constrained power, CPU, and memory resources. Zigbee operates over the 2.4 GHz frequency, with a range of 10-100 m and data rates of 250 kbps.

What is claimed:

1. A system for periodically creating wireless mesh networks comprising:
    a first beacon;
    a plurality of additional beacons;
    a static network; and
    a beacon management node,
        wherein when the first beacon operates in a broadcast mode, broadcasting a unique beacon ID for a first synchronization interval to a mobile device in the static network that is not the beacon management node,
        wherein the first beacon is not part of the static network while operating in broadcast mode, and the plurality of additional beacons are part of the static network,
        wherein after the first synchronization interval the first beacon and the plurality of additional beacons switch to operate in a mesh mode and form a periodic mesh network, further wherein at least one of the nodes in the periodic mesh network communicates a beacon status to the beacon management node,
        wherein the beacon management node sends a synchronization package, further wherein the synchronization package comprises an updated beacon ID and a second synchronization interval,
        wherein at least one node in the periodic mesh network receives the synchronization package and thus distributes the information in the synchronization package to the appropriate nodes in the periodic mesh network.

2. The system of claim 1 wherein the synchronization package contains a unique updated beacon ID for each beacon in the periodic mesh network.

3. The system of claim 1 wherein the synchronization package may instruct a beacon in the periodic mesh network to skip a cycle and not join next periodic mesh network.

4. The system of claim 1 wherein the beacon management node connects to the static network.

5. The system of claim 4 wherein the beacon management node receives updated beacon IDs from a beacon database through the static network.

6. The system of claim 4 wherein the beacon management node is controlled by a beacon management system through the static network.

7. The system of claim 4 wherein the mobile device receives an ad, corresponding to the beacon ID, from an advertisement database.

8. The system of claim 1 wherein the first beacon complies with the Bluetooth Low Energy standard.

9. A method for periodically creating wireless mesh networks comprising:
    a first beacon operating in a broadcast mode and broadcasting a unique beacon ID for a first interval to a mobile device in a static network that is not a beacon management node,
    wherein the first beacon is not part of the static network while operating in broadcast mode, and the static network includes a plurality of additional beacons,
    wherein after the first synchronization interval the first beacon and the plurality of additional beacons switch to operate in a mesh mode and form a periodic mesh network, further wherein at least one of the nodes in the periodic mesh network communicates a beacon status to the beacon management node,
    wherein the beacon management node sends a synchronization package, further wherein the synchronization package comprises of an updated beacon ID and a second synchronization interval,
    wherein at least one node in the periodic mesh network receives the synchronization package and thus distributes the information in the package to the appropriate nodes in the periodic mesh network.

10. The method of claim 9 wherein the synchronization package contains a unique updated beacon ID for each beacon in the periodic mesh network.

11. The method of claim 9 wherein the synchronization package may instruct a beacon in the periodic mesh network to skip a cycle and not join next periodic mesh network.

12. The method of claim 9 wherein the beacon management node connects to the static network.

13. The method of claim 12 wherein the beacon management node receives updated beacon IDs from a beacon database through the static network.

14. The method of claim 12 wherein the beacon management node is controlled by a beacon management system through the static network.

15. The method of claim 13 wherein the mobile device receives an ad, corresponding to the beacon ID, from an advertisement database.

16. The system of claim 9 wherein the first beacon complies with the Bluetooth Low Energy standard.

17. A system for providing targeted ads to a mobile device comprising:
    a first beacon comprising a transceiver and a battery, wherein the transmitter is able to transmit a beacon identifier;
    a mobile device capable of receiving the beacon identifier, and the device further comprising an application logic, wherein the application logic can translate the beacon identifier to a beacon ID and further look up the beacon ID in the cloud;
    a beacon database storing beacon IDs and the database is accessible by the cloud;
    an advertisement database to receive information for a beacon ID lookup and deliver a targeted ad to the mobile device requesting the lookup;
    a plurality of additional beacons;
    a static network; and
    a beacon management node,
        wherein when the first beacon operates in a broadcast mode, broadcasting a unique beacon ID for a first synchronization interval to the mobile device in the static network that is not the beacon management node,
        wherein the first beacon is not part of the static network while operating in broadcast mode, and the plurality of additional beacons are part of the static network, wherein after the first synchronization interval the first beacon and the plurality of additional beacons switch to operate in a mesh mode and form a periodic mesh network, further wherein at least one of the nodes in the periodic mesh network communicates a beacon status to the beacon management node, wherein the beacon management node sends a synchronization package, further wherein the synchronization package comprises an updated beacon ID and a second synchronization interval, wherein at least one node in the periodic mesh network receives the synchronization package and thus distributes the information in the synchronization package to the appropriate nodes in the periodic mesh network.

18. The system of claim 17 wherein the location of the first beacon is known and as such the location of the mobile device is approximated accordingly based on the received signal strength of the beacon identifier.

* * * * *